2,974,003

TREATMENT OF WOOL WITH ISOCYANATES IN THE PRESENCE OF DIMETHYLFORMAMIDE

Nathan H. Koenig, El Cerrito, Calif., assignor to the United States of America as represented by the Secretary of Agriculture No Drawing. Filed July 14, 1959, Ser. No. 827,129

10 Claims. (Cl. 8—128)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates broadly to the chemical modification of wool by reacting it with an organic isocyanate. In particular, the invention concerns and has as its prime object the provision of processes wherein the reaction of wool with organic isocyanates is conducted in the presence of N,N-dimethylformamide, hereafter referred to as dimethylformamide.

The prior art discloses various procedures wherein wool is treated with organic isocyanates. One technique involves applying the isocyanate to the wool and then baking the isocyanate-impregnated wool in an oven. Under these conditions, only a minor amount of isocyanate actually combines with the wool so that the degree of modification is low. Moreover, the modification attained is mostly due to a surface deposit of polymerized isocyanate on the wool rather than to actual chemical combination of the isocyanate with the wool. In another technique, the wool is heated with a solution of the isocyanate in an organic solvent such as a petroleum fraction, phenol, or cresol. This procedure was investigated by Barr et al. (Society of Dyers and Colourists, vol. 62, pp. 338,345, 1946) who point out that the modification attained is largely due to a surface deposit of polymerized isocyanate rather than cross-linking between the wool and the isocyanate. More recently Moore and O'Connell (Textile Research Journal, vol. 27, pp. 783-787) have disclosed that pyridine promotes the reaction of wool with isocyanates.

In accordance with the present invention, wool is reacted with an organic isocyanate in the presence of dimethylformamide. The latter compound acts as a reaction promoter and promotes actual chemical combination of the wool and the isocyanate reactant. The modified wool so produced exhibits increased resistance to acids, alkalis, and other reagents which degrade normal wool. It has been established that dimethylformamide is essentially as active as pyridine in promoting the wool-isocyanate reaction. Moreover, dimethylformamide is effective in lesser proportion than pyridine, is cheaper than pyridine, and has a mild odor in contrast to the offensive odor of pyridine. Also, dimethylformamide involves a lesser toxicity problem than pyridine and less fire hazard because of a lower order of vapor pressure. Further, the high boiling point of dimethylformamide (153° C.) makes it possible to conduct the wool-isocyanate reaction at higher temperatures without requiring pressure-tight vessels or other special apparatus. All of these items indicate that dimethylformamide is a very useful promoter for the reaction in question and one which involves many advantages over agents previously described.

The fact that dimethylformamide acts as a reaction promoter rather than a mere solvent is demonstrated by the following experimental data: Dry wool (1.2 g.), phenyl isocyanate (2 ml.), and dimethylformamide (3 ml.) were heated for one hour at 105° C. The wool was extracted with acetone and ethanol to remove unreacted reagents and dried. It was found that the increase in weight of the wool, due to reaction with the isocyanate, was 38%. A series of experiments were then carried out under the same conditions but substituting for the dimethylformamide the same volume of the following solvents: butyl acetate, butyl ether, butyl phosphate, dioxane, ethyl oxalate, methyl isobutyl ketone, toluene, and trimethylpentane. In these runs, the uptake of isocyanate by the wool was only 2 to 4%.

Carrying out the process of the invention essentially involves contacting wool with an isocyanate in the presence of dimethylformamide. The reaction conditions such as proportion of reagents, specific isocyanate used, time, temperature, etc., are not critical but may be varied to suit individual circumstances without changing the basic nature of the invention. The proportion of dimethylformamide may be varied widely and may be as low as 0.1 volume per volume of isocyanate. In the case of isocyanates which are normally solid, the volume considered is that of the molten (liquefied) compound. Usually, it is preferred to use a larger proportion of dimethylformamide, i.e., about 0.5 to 4 volumes thereof per volume of isocyanate, to attain an increased reaction promoting effect. The temperature of reaction may be about from 25° to 135° C. The reaction rate is increased with increasing temperature and a preferred temperature range to expedite the reaction without possibility of damage to the wool is 100–120° C. The effect of temperature on the rate of reaction is illustrated by the following: In a series of runs, phenyl isocyanate was reacted with wool in the presence of dimethylformamide under varying conditions of time and temperature. Uptakes of phenyl isocyanate of approximately 35% were obtained under these conditions:

| | |
|---|---|
| 52° C. | 24 hours. |
| 85° C. | 1 hour. |
| 105° C. | 15 to 30 minutes. |
| 135° C. | 5 to 10 minutes. |

Conventional inert volatile solvents such as chlorobenzene, toluene, or xylene may be added to the reaction system. The use of a solvent is especially indicated where the isocyanate used is a solid and the proportion of dimethylformamide is not sufficient to dissolve the isocyanate. It is preferred to carry out the reaction under anhydrous conditions thereby to ensure reaction between the wool and the isocyanate and to suppress the formation of insoluble byproducts as mere coatings on the wool. The reaction can be applied to wool in its normal undried condition (containing about 12–14% water) but in such case, the chemical reaction between wool and isocyanate will be accompanied by formation of insoluble isocyanate reaction products which deposit on the wool fibers. The degree of modification of the wool is influenced by the proportion of isocyanate taken up by the fiber, that is, the higher the uptake of isocyanate the greater will be the modification of the wool. In general, the uptake of isocyanate may be varied about from 1 to 70% by weight. In conducting the reaction, the isocyanate reactant is generally employed in excess over the amount desired to be taken up by the fiber. The time of reaction will vary depending on the proportion of dimethylformamide, temperature of reaction, reactivity of the isocyanate selected, and the degree of modification desired. In general, the reaction may take anywhere from a few minutes to several hours.

The process in accordance with the invention may be carried out in various ways. For example, the wool may be directly contacted with the dimethylformamide and isocyanate reactant and the reaction mixture preferably heated as indicated above to cause the isocyanate to react with the wool. In the alternative, the wool may be pretreated with dimethylformamide and the isocyanate then added to the mixture and the reaction carried out as previously described. The pretreatment may be carried out at normal temperature or with application of heat, i.e., 25–135° C.

After reaction of the wool with the isocyanate, the chemically modified fiber is preferably treated to remove excess isocyanate, dimethylformamide, and solvent, if such is used. Thus, the fiber may be treated as by wringing, centrifugation, or the like to remove the excess materials. In place of such mechanical action, or following it, the product may be extracted with an inert solvent such as benzene, acetone, carbon tetrachloride, alcohol, etc. Successive extractions with different solvents may be used to assure complete removal of all unreacted materials.

By treating wool with the isocyanate reagent as above described, the wool is chemically modified because there is a chemical reaction between the isocyanate and the protein molecules of the wool fibers. As a result, the modified wool exhibits many advantageous properties over normal wool. Outstanding in this regard is the resistance of the modified wool to acids and alkalies as indicated by its decreased solubility in these reagents. This factor enables the modified wool to be useful in applications where the product comes into contact with alkaline or acidic materials. In addition, the chemically modified wool displays a drastically decreased tendency to shrink when subjected to laundering operations. The modified wool is also much more resistant to oxidizing agents, which may be employed during bleaching or other finishing processes, as illustrated by its lowered solubility in the peracetic acid-ammonia test described later. Although the properties of the chemically modified wool indicate beyond question that actual combination between the wool and the isocyanate has taken place, it is not known for certain how the wool and isocyanate moieties are joined. It is believed, however, that the isocyanates react with all the sites on the wool molecule where there are reactive hydrogen atoms—these include such groups as amino, hydroxyl, thiol, phenolic, amide, guanidino, imidazoyl, and carboxyl. When the reagent is a diisocyanate, it is believed that cross-linking also occurs, that is, protein molecules are joined to one another through the diisocyanate. That cross-linking occurs is borne out by the fact that the chemically modified wool displays a decreased degree of supercontraction. Thus, the diisocyanate-reacted wool fibers when subjected to reducing agents which are capable of splitting disulfide bonds, contract to a much lesser degree than do the original fibers under the same conditions. It is to be particularly noted that the reaction in accordance with the invention does not impair the wool fiber for its intended purpose, that is, for producing woven or knitted textiles, garments, etc. Thus, at low and moderate isocyanate uptakes, the chemical resistance of wool can be greatly improved without appreciably adversely affecting the tensile strength, hand, or color of the wool.

The process of the invention may be applied to wool in the form of fibers, as such, or in the form of threads, yarns, slivers, knitted or woven goods, felts, etc.

The reaction promoting ability of dimethylformamide is not restricted to any particular isocyanate or class of isocyanates. Consequently, the invention may be applied in the reaction of wool with all types of organic isocyanates. Particularly preferred are the aliphatic, aromatic, or aromatic-aliphatic compounds containing one or more isocyanate groups. These compounds may be hydrocarbon isocyanates or may contain substituents on the hydrocarbon residue such as halogen (chlorine, bromine, iodine, and fluorine), ether groups, ester groups, nitro groups, etc. Examples of compounds coming into the purview of the invention are listed below by way of illustration and not limitation:

Typical examples of compounds in the category of aliphatic isocyanates are methyl isocyanate, ethyl isocyanate, propyl isocyanate, isopropyl isocyanate, butyl (normal, iso, secondary, or tertiary) isocyanate, amyl isocyanate, isoamyl isocyanate, hexyl isocyanate, octyl isocyanate, 2-ethylhexyl isocyanate, decyl isocyanate, dodecyl isocyanate, tetradecyl isocyanate, hexadecyl isocyanate, octadecyl isocyanate, cyclohexyl isocyanate, methyl cyclohexyl isocyanate, 2-chloroethyl isocyanate, 2-bromoethyl isocyanate, 2-iodoethyl isocyanate, 2-fluoroethyl isocyanate, 12-chlorododecyl isocyanate, 4-chlorocyclohexyl isocyanate, 2-methoxy ethyl isocyanate, 2-ethoxy ethyl isocyanate, 2-butoxy ethyl isocyanate, carbethoxymethyl isocyanate, ethylene diisocyanate, propylene diisocyanate, butylene diisocyanate, trimethylene diisocyanate, tetramethylene diisocyanate, hexamethylene diisocyanate, octamethylene diisocyanate, decamethylene diisocyanate, cyclohexylene diisocyanate, bis(2-isocyanatoethyl) ether, bis(2-isocyanatoethyl) ether of ethylene glycol, 1-chloropropane-2,3-diisocyanate, etc.

Typical examples of compounds in the category of aromatic isocyanates are phenyl isocyanate, o-tolyl isocyanate, m-tolyl isocyanate, p-tolyl isocyanate, xylyl isocyanate, alpha-naphthyl isocyanate, dodecylphenyl isocyanate, cyclohexylphenyl isocyanate, biphenylyl isocyanate, benzylphenyl isocyanate, o-chlorophenyl isocyanate, m-chlorophenyl isocyanate, p-chlorophenyl isocyanate, 2,5-dichlorophenyl isocyanate, p-bromophenyl isocyanate, o-methoxyphenyl isocyanate, p-methoxyphenyl isocyanate, o-ethoxyphenyl isocyanate, p-ethoxyphenyl isocyanate, m-nitrophenyl isocyanate, p-nitrophenyl isocyanate, o-phenylene diisocyanate, m-phenylene diisocyanate, p-phenylene diisocyanate, tolylene-2,4-diisocyanate, tolylene-2,6-diisocyanate, 3,3'-bitolylene-4,4'-diisocyanate, i.e.,

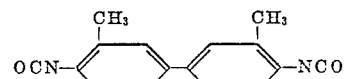

3,5,3',5'-bixylylene-4,4'-diisocyanate, i.e.,

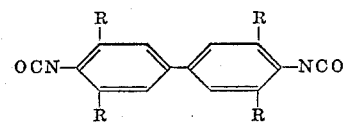

(R is —CH₃)

diphenylmethane-4,4'-diisocyanate, i.e.,

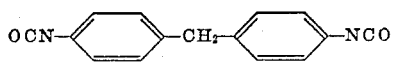

biphenylene-4,4'-diisocyanate, 3,3'-dimethoxy-biphenylene-4,4'-diisocyanate, naphthalene diisocyanates, polymethylene polyphenyl isocyanates, etc.

Typical examples of aromatic-aliphatic isocyanates are benzyl isocyanate, chlorobenzyl isocyanates, methylbenzyl isocyanates, methoxybenzyl isocyanates, nitrobenzyl isocyanates, 2-phenoxyethyl isocyanate, 2-benzoxyethyl isocyanate, etc.

EXAMPLES

The invention is demonstrated by the following illustrative examples. Percentages are by weight, unless otherwise specified. The tests referred to in the examples were carried out as follows:

*Acid solubility.*—Determined by immersing the wool in 4 N hydrochloric acid for one hour at 65° C. The loss in weight is determined after thoroughly washing the acid-soaked wool.

*Alkali solubility.*—Determined by immersing the wool in 0.1 N sodium hydroxide for one hour at 65° C. The loss in weight is determined after thorough washing of the alkali-soaked wool.

*Solubility in peracetic acid-$NH_3$.*—Four hundred mg. of wool is treated for 25 hours with 100 ml. of 2% peracetic acid and finally with 100 ml. of 0.3% ammonium hydroxide. The loss in weight is determined after thorough washing with water.

*Degree of supercontraction.*—Determined by measuring the length of the wool fiber before and after being immersed in 5% sodium bisulfite at 100° C. for one hour. The supercontraction is the percentage proportion of (a) the decrease in length after treatment with the disulfide bond-breaking reagent (sodium bisulfite) to (b) the original length of the fiber. Thus, this property of the wool is an index of cross-linking of the protein molecule—the less the contraction after treatment with the reducing agent, the greater is the degree of cross-linking. The supercontraction of untreated wool by the above procedure is 27%.

*Shrinkage.*—The wool samples were milled at 1700 r.p.m for 2 minutes at 40–42° C. in an "Accelerotor" with 0.5% sodium oleate solution, using a liquor to wash ratio of 50 to 1. After this laundering operation, the samples were measured to determine their area.

Example I

A 2-gram sample of scoured, dry Lincoln wool was heated with 15 ml. of dimethylformamide and 10 ml. phenyl isocyanate for 1 hour at 105° C. The treated wool was extracted with acetone and ethanol to remove unreacted reagents and dried. The uptake of phenyl isocyanate by the wool was 39.1%.

Example II

A sample of dry mohair was treated under the same conditions as in Example I. The uptake of phenyl isocyanate by the mohair was 41.5%.

Example III

A 1.6 gram sample of dry wool cut from a knitted sock was treated with 9 ml. dimethylformamide and 6 ml. phenyl isocyanate for 60 minutes at 105° C. The treated wool was extracted as described above; the uptake was 36.4%.

Example IV

To a 4.6 gram sample of dried wool flannel was added 15 ml. of dimethylformamide and 10 ml. phenyl isocyanate. The reaction system was allowed to stand at room temperature (25° C.) for 3 days. The treated fabric was extracted as above; the uptake was 11.4%.

Example V

A 1.2 gram sample of dry wool flannel was heated with 2 ml. phenyl isocyanate, 1 ml. dimethylformamide, and 7 ml. toluene for 1 hour at 105° C. The treated wool was extracted as described; the uptake was 14.4%.

Example VI

Two grams of m-nitrophenyl isocyanate was dissolved in 10 ml. dimethylformamide. This solution was heated with 1.2 g. dry wool flannel for 15 minutes at 105° C. The treated wool was extracted as described; the uptake was 43%. The treated wool in this case was yellow because of the nitro group.

Example VII

A 4.2 gram sample of dry wool flannel was heated with 5 g. p-chlorophenyl isocyanate and 20 ml. dimethylformamide for 30 minutes at 105° C. The treated wool was extracted as above. The uptake was 46.1%.

Example VIII

A 4.0 gram sample of dry wool flannel was heated with 10 g. p-chlorophenyl isocyanate and 15 ml. dimethylformamide for 1 hour at 105° C. The treated wool was extracted as described; uptake was 60.7%. Peracetic acid-$NH_3$ solubility of the product was 0%; alkali solubility was 3%.

Example IX

A solution of 2 ml. of tolylene-2,4-diisocyanate in 10 ml. of dimethylformamide was added to 1.2 g. of dry wool flannel. The reaction system was heated for 60 minutes at 105° C. The treated wool was extracted as described; the uptake was 25%.

Example X

A 1.2 gram sample of dry wool flannel was treated with 2.4 grams of 3,3'-bitolylene-4,4'-diisocyanate and 12 ml. dimethylformamide for 15 minutes at 105° C. The treated wool was extracted as described; the uptake was 15.1%.

Example XI

Dry wool flannel (1.2 grams), dimethylformamide (3 ml.) and tolylene-2,4-diisocyanate (2 ml.) were heated together for 20 minutes at 105° C. The wool was then extracted with hot acetone followed by ethanol.

The results obtained are as follows:

|  | Percent |
|---|---|
| Uptake of tolylene diisocyanate | 11.7 |
| Peracetic-$NH_3$ solubility | 29.6 |
| Alkali solubility | 5.5 |
| Supercontraction | 3.5 |

Example XII

Dry wool flannel (1.2 grams) and dimethylformamide (3 ml.) were heated together at 105° C. for 2 minutes, then cooled to room temperature. Hexamethylene diisocyanate (3 ml.) was then added and the mixture was heated at 105° C. for 6 minutes. The wool was extracted as previously described.

The results are tabulated below:

|  | Treated wool | Untreated wool (control) |
|---|---|---|
| Uptake of isocyanate, percent | 14 | 0 |
| Acid solubility, percent | 1.9 | 8 |
| Alkali solubility, percent | 2.8 | 12 |
| Peracetic-$NH_3$ solubility, percent | 27.6 | 85 |
| Supercontraction, percent | 4.1 | 27 |

Example XIII

A 1.2 gram sample of dry wool flannel was heated with 1.5 ml. polymethylene polyphenylisocyanate and 15 ml. dimethylformamide for 30 minutes at 105° C. The treated wool was extracted as described; the uptake was 9%.

The polymethylene polyphenyl isocyanate used in this run was a commercial product containing a mixture of compounds corresponding to the formula below where n is equal to one or more. The chief component of the mixture is the triisocyanate, i.e., $n=1$.

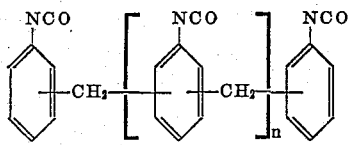

Example XIV

A series of runs was carried out wherein dry wool flannel was reacted with various monoisocyanates in the presence of dimethylformamide. In these runs, the weight of dry wool was 1.2 grams, the volume of isocyanate was 2 ml., the volume of dimethylformamide was 3 ml., and the temperature of reaction was 105° C. In several cases, the amount of isocyanate or dimethylformamide was varied as noted following Table I. The isocyanates, the reaction times, the uptake of isocyanate, and the properties of the modified wool products are tabulated below.

TABLE I.—MONOISOCYANATES

| Isocyanate | Reaction, time, min. | Uptake of isocyanate, Percent | Peracetic-NH₃ solubility, Percent | Alkali solubility, Percent | Acid solubility, Percent |
|---|---|---|---|---|---|
| (Untreated wool) | 0 | 0 | 85 | 12 | 8 |
| Phenyl | 5 | 8 | 65 | 9 | 1 |
| do | 30 | 38 | 8 | 2 | 0 |
| o-Tolyl | 30 | 32 | 28 | 14 | 0 |
| m-Tolyl | 30 | 43 | 11 | 4 | 0 |
| p-Tolyl | 30 | 33 | 14 | 3 | 0 |
| o-Chlorophenyl [1] | 30 | 29 | 17 | 4 | 2 |
| m-Chlorophenyl | 60 | 52 | 4 | 1 | 0 |
| 2,5-Dichlorophenyl [2] | 30 | 66 | 2 | 2 | 5 |
| p-Bromophenyl | 30 | 71 | 11 | 1 | 0 |
| o-Methoxyphenyl | 60 | 37 | 24 | 13 | 2 |
| p-Methoxyphenyl | 60 | 49 | 12 | 4 | 1 |
| o-Ethoxyphenyl | 60 | 34 | 31 | 12 | 1 |
| p-Ethoxyphenyl [3] | 30 | 42 | 16 | 4 | 1 |
| m-Nitrophenyl [4] | 15 | 43 | 13 | 5 | 1 |
| p-Nitrophenyl [5] | 15 | 21 | 41 | 2 | 2 |
| 1-Naphthyl [6] | 20 | 50 | 22 | 5 | 0 |
| 2-Biphenylyl [7] | 30 | 43 | 18 | 6 | 1 |
| Cyclohexyl | 60 | 12 | 40 | 12 | |
| n-Butyl | 65 | 16 | 30 | 15 | 1 |
| n-Octadecyl | 60 | 28 | 12 | 3 | 0 |
| Carbethoxymethyl [8] | 30 | 28 | 59 | 38 | 10 |

[1] In this run, 3 ml. of o-chlorophenyl isocyanate was used.
[2] Volume of dimethylformamide was 4 ml.
[3] Volume of p-ethoxyphenyl isocyanate was 3 ml.
[4] Volume of dimethylformamide was 10 ml.
[5] Volumes of p-nitrophenyl isocyanate and dimethylformamide were 1.3 ml. and 5 ml., respectively.
[6] Volume of 1-naphthyl isocyanate was 3 ml.
[7] Volumes of biphenylyl isocyanate and dimethylformamide were 4 ml. and 6 ml., respectively.
[8] Volume of carbethoxymethyl isocyanate was 3 ml.

*Example XV*

A series of runs was carried out wherein dry wool flannel was reacted with various polyisocyanates in the presence of dimethylformamide. The reactions were carried out at 105° C., and the weight of dry wool reacted in each case was 1.2 grams. Other conditions and the properties of the products are tabulated below.

TABLE II.—POLYISOCYANATES

| Isocyanate | Wt. or vol. of isocyanate | Volume of dimethylformamide, ml. | Reaction time, min. | Uptake of isocyanate, percent | Peracetic acid-NH₃ solubility percent | Alkali solubility, percent | Acid solubility, percent |
|---|---|---|---|---|---|---|---|
| (Untreated wool) | 0 | 0 | 0 | 0 | 85 | 12 | 8 |
| m-Phenylene diisocyanate | 1 g | 10 | 20 | 8 | 39 | 6 | 2 |
| Tolylene-2,4-diisocyanate | 4 ml | 4 | 30 | 12 | 35 | 3 | 2 |
| 3,3'-Bitolylene-4,4'-diisocyanate | 1.3 g | 5 | 30 | 17 | 39 | 4 | 3 |
| 3,5,3',5'-Bixylylene-4,4'-diisocyanate | 2 ml | 3 | 30 | 16 | 19 | 3 | 0 |
| Diphenylmethane-4,4'-diisocyanate | 2 g | 6 | 15 | 8 | 30 | 3 | 0 |
| Hexamethylene diisocyanate | 3 ml | 3 | 6 | 14 | 28 | 3 | 2 |
| Polymethylene polyphenyl isocyanate [1] | 1.5 ml | 15 | 30 | 9 | 24 | 4 | 2 |

[1] Identified in Example XIII.

*Example XVI*

The improvement in shrinkage properties of wool modified in accordance with the invention is illustrated by the following data—

| Isocyanate | Uptake of isocyanate, Percent | Area shrinkage, Percent |
|---|---|---|
| Untreated wool | 0 | 49 |
| Phenyl isocyanate | 15 | 3 |
| Diphenylmethane-4,4'-diisocyanate | 18 | 1 |
| Tolylene-2,4-diisocyanate | 13 | 9 |
| Do | 4 | 23 |
| m-Phenylene diisocyanate | 12 | 8 |
| 3,3'-Bitolylene-4,4'-diisocyanate | 23 | 0 |
| Polymethylene polyphenyl isocyanate | 17 | 0 |

Having thus defined the invention, what is claimed is:

1. A process for chemically modifying wool which comprises reacting wool under essentially anhydrous conditions, in the presence of dimethylformamide, with an organic isocyanate of the class consisting of aliphatic, aromatic, and aromatic-aliphatic isocyanates at a temperature about from 25 to 150° C. until the wool combines with about from 1 to 70% of its weight of the isocyanate.

2. The process of claim 1 wherein the isocyanate is an aryl monoisocyanate.

3. The process of claim 1 wherein the isocyanate is phenyl isocyanate.

4. The process of claim 1 wherein the isocyanate is an alkyl monoisocyanate.

5. The process of claim 1 wherein the isocyanate is octadecyl isocyanate.

6. The process of claim 1 wherein the isocyanate is an arylene diisocyanate.

7. The process of claim 1 wherein the isocyanate is tolylene-2,4-diisocyanate.

8. The process of claim 1 wherein the isocyanate is diphenylmethane-4,4'-diisocyanate.

9. The process of claim 1 wherein the isocyanate is an alkylene diisocyanate.

10. The process of claim 1 wherein the isocyanate is hexamethylene diisocyanate.

References Cited in the file of this patent

UNITED STATES PATENTS

| 2,482,578 | Doggett et al. | Sept. 20, 1949 |
| 2,569,470 | Hagemeyer et al. | Oct. 2, 1951 |
| 2,647,884 | Wystrach | Aug. 4, 1953 |
| 2,880,054 | Moore | Mar. 31, 1959 |
| 2,888,313 | Mauther | May 26, 1959 |